UNITED STATES PATENT OFFICE.

ACHILLES DE KHOTINSKY, OF GELNHAUSEN, PRUSSIA, GERMANY.

MANUFACTURE OF CARBON CONDUCTORS.

SPECIFICATION forming part of Letters Patent No. 432,490, dated July 15, 1890.

Application filed February 3, 1890. Serial No. 339,083. (No specimens.)

*To all whom it may concern:*

Be it known that I, ACHILLES DE KHOTINSKY, a subject of the Emperor of Russia, residing at Gelnhausen, Kingdom of Prussia, Germany, have invented a new and useful Improvement in the Manufacture of Carbon Conductors for Electric Incandescent Lamps, whereof the following is a specification.

From the raw materials heretofore nearly exclusively employed in the production of conductors for incandescent lamps it is difficult in an extensive manufacture to obtain a considerable number of conductors that are absolutely alike in transverse section and in quality. From this deficiency there results in the employment of the conductors in incandescent lamps an unequal luminous power and unequal consumption of current. The cause of this deficiency is that the raw material has a fibrous structure which is still present in the conductors after their carbonization, as may be plainly observed under the microscope, and wherefrom results a low degree of elasticity and inconsiderable and non-uniform density of the conductors.

The object of my invention consists in the manufacture of carbon conductors for incandescent lamps which do not possess the said disadvantages. The process which I employ for this purpose is as follows: Natural cellulose, preferably cotton, is purified by freeing the same from fatty matter and thereupon treating it with muriatic acid or hydrofluoric acid, or both, in view of extracting mineral substances. This purified cellulose is immersed in phosphoric acid having a specific gravity of about 1.70 and heated to not less than 40° and not above 45° centigrade, a gelatinous mass being thus produced. The said mass is well worked by means of a stirring apparatus, whereby it is converted within a short time into a clear solution. The consistency of this solution depends upon the quantity of cellulose employed, a good proportion being two parts, by weight, of cellulose to one hundred parts of phosphoric acid. During the whole operation the aforesaid temperature has to be maintained. The solution of cellulose in phosphoric acid thus obtained has the property that when it is poured into or otherwise brought together with a considerable quantity of pure water or of alcohol the cellulose will be separated out or precipitated from the solution in an amorphous state, this being a property not inherent in solutions of cellulose in sulphuric acid and other substances. The cellulose precipitated by the said means is of pure white color, and resembles precipitated hydrate of alumina in appearance as well as in its behavior during filtration. In case the solution is kept for some time it assumes a light-brown color.

From the solution of cellulose in phosphoric acid prepared as described carbon conductors for electric incandescent lamps may be produced in two different manners.

First. The solution is poured on plates of glass, and alcohol or any other substance adapted to separate out the cellulose is poured upon the former. By these means the cellulose is obtained in form of an amorphous homogenous plate. By washing with distilled water this plate is freed from the remaining phosphoric acid and dried. Subsequently the plate may be passed between smooth rollers or pressed between even surfaces in order to impart to the same greater density and uniform thickness. Finally, the plate is cut or otherwise divided into strips.

Second. The solution is evaporated down to the requisite consistency, and is thereupon pressed through a perforated plate having orifices of the required form and size, and arranged above a vessel containing alcohol or any other liquid which has the property of precipitating cellulose from its solutions.

The strips or threads thus produced are carbonized, as usual, and employed in the manufacture of incandescent lamps in the ordinary manner.

By means of the described process an unlimited number of carbon conductors may be produced which are absolutely alike in their physical properties, in their transverse section, and in density. Besides this the new conductors have greater density than other carbon conductors, as is proved by their higher specific gravity and inferior specific resistance. Finally, their elasticity is such that carbonized conductors having horseshoe form, or even when made with a loop, may be bent straight without breaking, while on being thereafter released they rebound to their original state like a steel spring.

I claim as my invention—

The process of manufacturing carbon conductors for electric incandescent lamps, which consists in dissolving purified natural cellulose in phosphoric acid of a specific gravity of about 1.70, maintaining the temperature of the acid at from 40° to 45° centigrade, forming strips or threads from the solution, separating the cellulose from the phosphoric acid by a liquid capable of precipitating the same from its said solution in an amorphous state, such as water and alcohol, and carbonizing the strips or threads, substantially as described.

In testimony whereof I have hereunto set my hand in the presence of two subscribing witnesses.

ACHILLES DE KHOTINSKY.

Witnesses:
JEAN GRUND,
ALVESTO S. HOGUE.